United States Patent [19]

Testemale

[11] 4,183,251
[45] Jan. 15, 1980

[54] TIMER MECHANISM

[75] Inventor: Jean Testemale, Paris, France

[73] Assignee: Societe Nouvelle des Appareils de Precision et Compteurs, Paris, France

[21] Appl. No.: 883,944

[22] Filed: Mar. 6, 1978

[30] Foreign Application Priority Data

Mar. 9, 1977 [FR] France ............................ 77 06908

[51] Int. Cl.$^2$ ............................................ F16H 25/08
[52] U.S. Cl. ........................................ 74/54; 74/384; 200/38 F
[58] Field of Search ................ 74/54, 25, 70, 56, 87, 74/384; 200/38 F, 38 FA, 38 B, 38 FB; 236/46 R; 337/302, 305

[56] References Cited

U.S. PATENT DOCUMENTS

| 2,578,632 | 12/1951 | Miller | 74/54 |
| 3,686,450 | 8/1972 | Willis | 200/38 R |
| 3,967,078 | 6/1976 | Yaguinuma | 200/38 R |
| 4,123,739 | 10/1978 | Helms | 236/46 R |

Primary Examiner—C. J. Husar
Assistant Examiner—Conrad Berman
Attorney, Agent, or Firm—Young & Thompson

[57] ABSTRACT

A timer mechanism for controlling a thermostat having a control shaft, the mechanism comprising: a frame, a synchronous motor mounted in the frame, a first and second lever pivotably mounted on the frame so as to be able to take an operative and an inoperative position, cam motion transmission means operatively connected to the said motor so as sequentially to pivot the said first lever from its inoperative to its operative position, while pivoting the said second lever to its inoperative position, and from its inoperative to its operative position, while pivoting the said second lever to its operative position, first transmission means operatively connected to the said motor and controlled by the said first lever to rotate the said control shaft in a first direction when the said first lever is in its operative position, and second transmission means operatively connected to the said motor and controlled by the said second lever to rotate the said control shaft in the opposite direction of rotation when the second lever is in its operative position.

7 Claims, 4 Drawing Figures

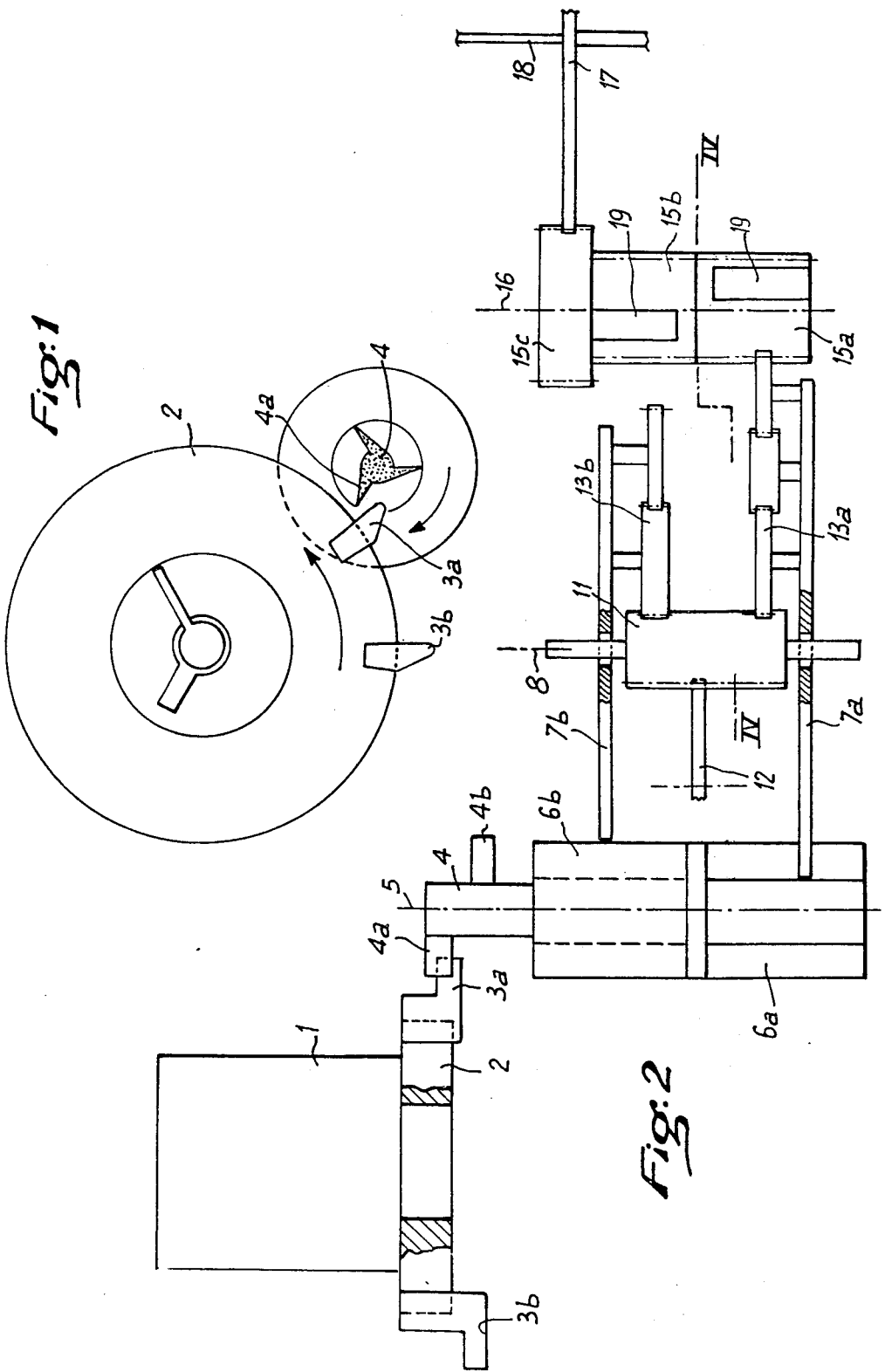

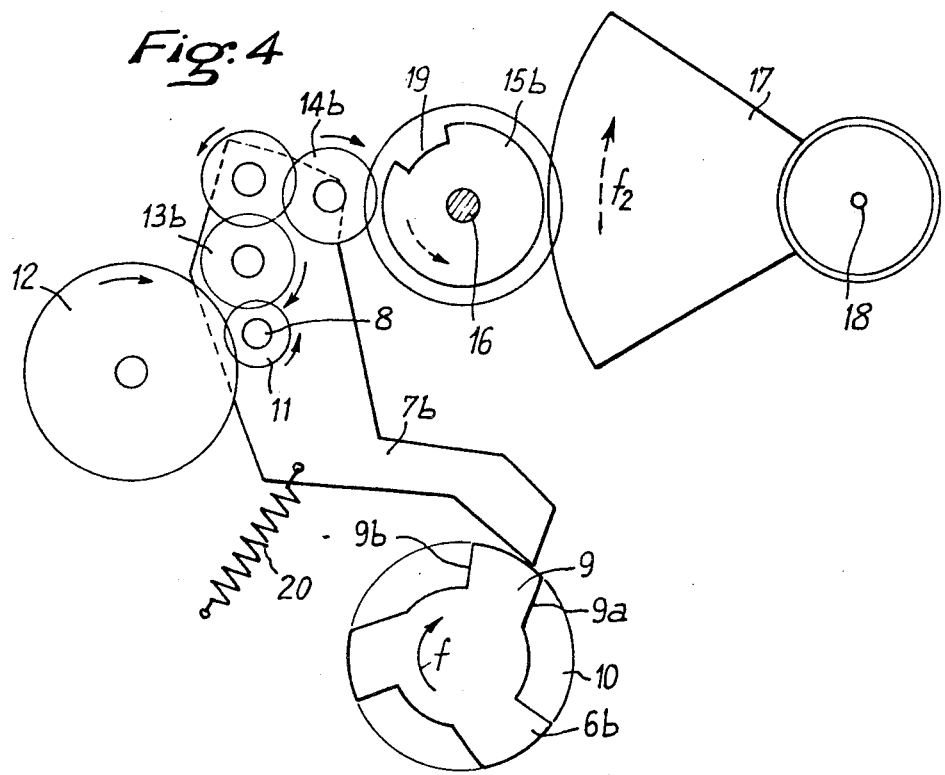
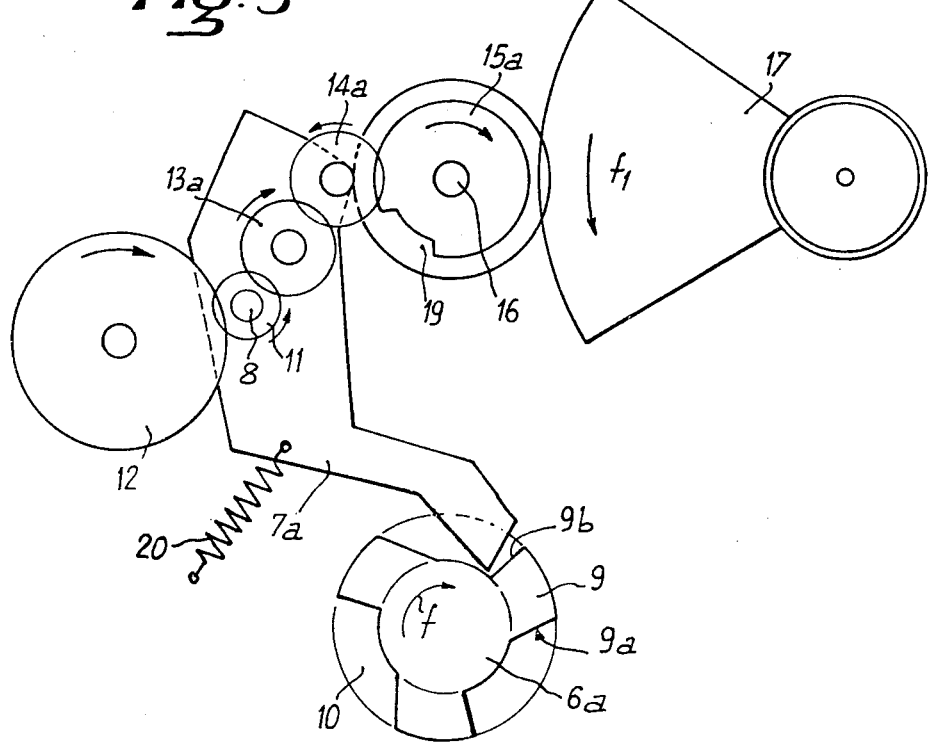

TIMER MECHANISM

The present invention relates to a timer mechanism for automatically readjusting a set temperature in a thermostat.

In conventional heating installation, a pre-set temperature on a control thermostat is generally reduced either manually or by means of a timer during the night. The operating temperature of the thermostat is most often lowered by energising an auxiliary resister incorporated in the thermostat. This resistor locally heats the thermostat relative to the environment of the room in which the thermostat is disposed, which leads to a lowering in the temperature to which said room is heated. However, the temperature lowering thus obtained is not precise. It depends in particular on the extent to which heat is dissipated by the resistor, the position of the resistor in the thermostat, the location of the room in which the thermostat in disposed, and the extent to which the room is ventilated.

An object of the present invention is to provide a thermostatic timer which may be mechanically readjusted to overcome the aforesaid drawbacks.

According to the invention there is provided a timer mechanism for controlling a thermostat comprising a group of program cams controllable by a synchronous motor, two pivotable levers controlled by the group of cams sequentially to taken an operative and an inoperative position so that when one lever is in its operative position the other is in its inoperative position, two transmission units connected to the motor and capable of driving a control shaft of the thermostat, each transmission unit being controlled, in use, by a respective lever so that the control shaft is rotated in one direction when one of the levers is in its operative position and in the opposite direction when the other lever is in its operative position.

In operation, at a given time, the synchronous motor causes one of the levers to swivel and come into the working or operative position such that an exit pinion of the transmission which it carries comes into engagement with its gear wheel and causes a thermostat control shaft to rotate in the direction corresponding to a reduction in its set temperature. The control shaft rotates until the exit pinion comes opposite a non-toothed portion of the wheel, so that the shaft stops rotating whereas the pinion continues to rotate. A certain time afterwards, the lever is pivoted to its rest or inoperative position, whereas the second lever comes into its working or operative position and its exit pinion, by engaging with its gear wheel, causes the thermostat control shaft to rotate in the opposite direction until the set temperature has returned to its initial value, the exit pinion then being opposite the non-toothed portion of the wheel.

In one particular embodiment of the invention, the two levers are pivotally mounted on an axis about which there is rotatably mounted a pinion connected both to the synchronous motor and the inlet pinions of the geared transmissions of the two levers, one of said transmissions comprising an even number of gears and the other an odd number of gears so that the pinions are driven in opposite directions.

At its periphery, a control disc comprises fingers or blocks arranged to rotate cams controlling the levers.

Each of the two exit pinions may cooperate with its own gear wheel comprising incomplete toothing, the two gear wheels being keyed on to one shaft, which also carries a third gear wheel engaged with a toothed sector fixed on the thermostat control shaft.

An embodiment of the timer mechanism according to the invention is described below with reference to the accompanying drawings, in which:

FIG. 1 is a front view showing a control disc;

FIG. 2 is a plan view of the timer mechanism;

FIG. 3 is a side view on a larger scale of a detail of FIG. 2, and

FIG. 4 is a cross-sectional view taken along the line IV—IV of FIG. 2.

With reference to the above Figures, the timer mechanism comprises a synchronous motor 1 driving a program control disc 2, for example at a speed of one revolution per 24 hours or one revolution per 7 days.

At its periphery, the disc 2 carries fingers or blocks 3a and 3b, which are adjustable in position and arranged to drive a control cam 4 mounted for rotation about an axis 5. The cam 4 is constituted by a cylindrical hub carrying blades 4a and 4b at its periphery. The fingers 3a are axially offset with respect to the fingers 3b; this also applies to the blades 4a and 4b. The blades 4a and 4b are shaped such that when they are engaged and pushed by a finger 3a or 3b respectively, the cam may turn through about 60°.

The cam 4 is rigid with two coaxial cams 6a and 6b, each of which cooperates with a respective lever 7a or 7b mounted for rotation about an axis 8. The two cams 6a and 6b are identical, and each comprise three lobes or fingers 9 (FIG. 3). A face 9a of the cams 6a and 6b is situated to the front relative to the direction of rotation indicated by the arrow f and is inclined with respect to a radial direction, whereas the rear face 9b of the cams extends substantially radially. The fingers 9 are separated from each other by cavities 10 into which one end of the lever 7a or 7b can engage. When the cams rotate, the front face 9a of one of their fingers encounters one end of the respective lever 7a or 7b which is slowly pivoted in counterclockwise direction to pass from the position shown in FIG. 3 for the lever 7a to the position shown in FIG. 4 for the lever 7b. As the cam continues to rotate, the lever exceeds the rear face 9b of the respective finger 9 and is released to rapidly return, under the action of a spring 20, into its initial position (position of the lever 7a in FIG. 3). The two cams 6a and 6b are angularly offset one with respect to the other so that one of the levers 7a or 7b returns to its rest position (FIG. 3) at the moment when the other begins to leave this position.

A pinion 11 is mounted for rotation about the axis 8, and meshes with a gear wheel 12 operatively connected to the motor 1 in a manner shown in FIGS. 3 and 4. The pinion 11 also meshes with two pinions 13a and 13b mounted for rotation on a respective lever 7a or 7b. The pinions 13a and 13b are each connected by way of a group of gears to a respective pinion 14a or 14b mounted on the lever 7a or 7b, respectively. The groups of gears comprise different numbers of toothed wheels or gears so that the pinions 14a and 14b are rotated in opposite directions.

When the lever which carries the pinion 14a or 14b is pivoted, the pinion on it can mesh with a respective pinion 15a or 15b. The pinions 15a and 15b are fixed on a shaft 16 which also carries a pinion 15c. The pinion 15c is in meshing engagement with a toothed sector 17 fixed on a shaft 18 arranged to control a thermostat (not shown).

The toothing of the pinions 15a and 15b is interrupted at a peripheral recessed portion 19 which has no teeth in it. The toothing of the two pinions 15a and 15b are angularly offset relative to each other, i.e. the two portions 19 are not in alignment.

When a finger such as 3a encounters one of the blades 4a of the cam 4, it slowly rotates this cam, and thus also the cams 6a and 6b. The end of the lever 7a which rests on a tooth 9 of the cam 6a falls into a cavity 10 in the cam so that the pinion 14a comes into meshing engagement with the pinion 15a. At this point, one end of the lever 7b is on a tooth 9 of the cam 6b, and thus the pinion 14b is disengaged from the pinion 15b.

The shaft 18 is rotated in the direction of the arrow $f_1$(FIG. 3), to reduce the set temperature on the thermostat, this temperature reduction continuing until the teeth of the pinion 14a come in front of the recessed portion 19 of the pinion 15a.

After a given time, the finger 3b encounters one of the blades 4b of the cam 4, and again causes the group of cams 4, 6a and 6b to rotate. One end of the lever 7a is engaged by the inclined face 9a of the following finger or lobe 9 so that the lever 7a takes the position shown in FIG. 4, and the pinion 14a becomes disengaged from the pinion 15a.

The end of the lever 7b then falls into a cavity 10 in the cam 6b, so that the pinion 14b comes into meshing engagement with the pinion 15b. The shaft 18 is then driven in the direction of the arrow $f_2$(FIG. 4), i.e. in the opposite direction to that of the arrow $f_1$, to increase the set temperature on the thermostat. This movement continues until the teeth 14b come in front of the recessed portion 19 of the pinion 15b. At that point the set temperature has returned to its initial value, and the shaft 18 stops rotating. At the same time the pinion 14a is again in front of a toothed portion of the pinion 15a, so that the timer is ready for a new operating cycle, to be initiated by the following finger 3a on the wheel 2 which will again cause the assembly of cams 4, 6a and 6b to rotate.

I claim:

1. A timer mechanism for controlling a thermostat having a control shaft, the mechanism comprising: a frame, a synchronous motor mounted in the frame, a first and second lever pivotably mounted on the frame so as to be able to take an operative and an inoperative position, cam motion transmission means operatively connected to the said motor so as sequentially to pivot the said first lever from its inoperative to its operative position, while pivoting the said second lever to its inoperative position, and from its inoperative to its operative position, while pivoting the said second lever to its operative position, first transmission means operatively connected to said motor and controlled by the said first lever to rotate the said control shaft in a first direction when the said first lever is in its operative position, and second transmission means operatively connected to the said motor and controlled by the said second lever to rotate the said control shaft in the opposite direction of rotation when the said second lever is in its operative position.

2. A timer mechanism as claimed in claim 1, wherein the said first transmission means comprises a toothed gearing having an odd number of gears in meshing engagement with one another, a partially toothed wheel arranged to mesh with the said gearing when the said first lever is in its operative position, and a first toothed sector fixed to the said control shaft and in meshing engagement with the said partially toothed wheel.

3. A timer mechanism as claimed in claim 1, wherein the said second transmission means comprises a toothed gearing having an even number of gears in meshing engagement with one another, a partially toothed wheel arranged to mesh with the said gearing when the said second lever is in its operative position, and a second toothed sector fixed to the said control shaft and in meshing engagement with the said partially toothed wheel.

4. A timer mechanism as claimed in claim 1, wherein the said first and second levers are mounted on a common axis of rotation.

5. A timer mechanism as claimed in claim 4, wherein the said first and second transmission means comprise a common gear mounted for rotation about the common axis of rotation of the said levers.

6. A timer mechanism as claimed in claim 1, wherein the said transmission means comprises a programme disc operatively connected to the said motor, a driven cam adjacent to and arranged to be driven by the said disc, and a first and a second central cams in engagement relationship with the said first and second lever, respectively and rigid in rotation with the said driven cam.

7. A timer mechanism as claimed in claim 6, wherein the control cams are identical and mounted angularly offset on a common axis of rotation.

* * * * *